UNITED STATES PATENT OFFICE.

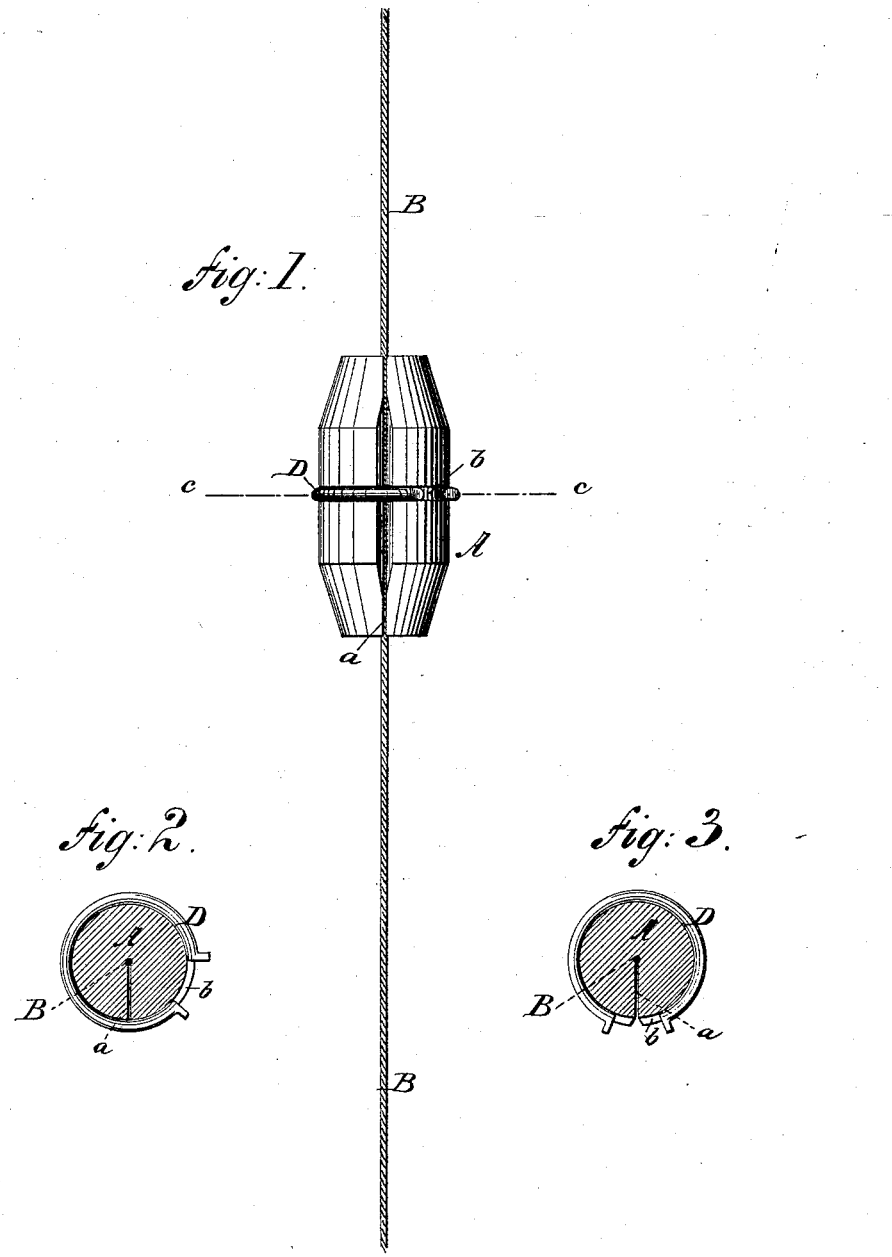

CHARLES PALM, OF NEW YORK, N. Y.

FLOAT FOR FISH-LINES.

SPECIFICATION forming part of Letters Patent No. 327,100, dated September 29, 1885.

Application filed June 9, 1885. (No model.)

*To all whom it may concern:*

Be it known that I, CHARLES PALM, of New York city, in the county and State of New York, have invented an Improved Float for Fish-Lines and the like, of which the following is a specification, reference being had to the accompanying drawings, in which—

Figure 1 is a side view of my improved float for fish-lines. Fig. 2 is a horizontal section of the same on the line $c\ c$, Fig. 1, showing the collar turned so as to prevent the float from disengaging itself from the fish-line. Fig. 3 is a similar section thereof, showing the collar turned so as to allow of the removal of the float from the fish-line.

This invention relates to improvements in floats for fish-lines and the like.

It consists in providing the float proper with a longitudinal cut or incision, into which the fish-line is inserted, and in providing the periphery of the said float with a collar having an opening between its ends, and which collar may be turned into such positions as to allow the said line to be inserted in, removed from, or confined within said cut.

In the drawings, the letter A represents the float proper, which has a longitudinal cut or incision, $a$, and B is the fish line. The cut or incision $a$ may be oblique or curved, if desired. This cut $a$ should be narrower than the diameter of the line B, to prevent the said float A from sliding loosely upon said line B, the friction between the sides of the cut and the line being sufficiently great to accomplish this.

The periphery of the float A is provided with a groove, $b$, into which is sprung a collar, D. This collar D has one or both of its ends turned out, as shown in the drawings, and an open space is left between said ends. The projecting end or ends will serve as means for turning said collar.

When my improved float is to be attached to the fish-line, the collar D is turned in the groove $b$ into the position shown in Fig. 3, so as to open the incision or cut $a$, and the said line is inserted in the cut $a$, after which the collar D is turned into the position shown in Fig. 2, closing said cut and preventing the line from disengaging itself from the float.

The friction between the line and the sides of the cut $a$ firmly holds the float A on the said line and prevents longitudinal displacement of the float.

I claim—

1. The float A, having a cut or incision, $a$, combined with the collar D, which partly but not wholly embraces the said float, substantially as herein shown and described.

2. The combination of the line B with the longitudinally-slotted float A, having circumferential groove $b$, and with the collar D, which partly but not wholly embraces the said float, as specified.

CHARLES PALM.

Witnesses:
CHARLES G. M. THOMAS,
HARRY M. WEEK.